(12) United States Patent
Mehrabanzad et al.

(10) Patent No.: US 11,683,087 B2
(45) Date of Patent: *Jun. 20, 2023

(54) CLOUD BASED ACCESS SOLUTION FOR ENTERPRISE DEPLOYMENT

(71) Applicant: Federated Wireless, Inc., Arlington, VA (US)

(72) Inventors: Sepehr Mehrabanzad, Wellesley, MA (US); Deepak Das, Lexington, MA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/244,606

(22) Filed: Jan. 10, 2019

(65) Prior Publication Data

US 2019/0150208 A1 May 16, 2019

Related U.S. Application Data

(63) Continuation of application No. 15/150,374, filed on May 9, 2016, now Pat. No. 10,219,306.
(Continued)

(51) Int. Cl.
*G06F 15/16* (2006.01)
*H04B 7/185* (2006.01)
(Continued)

(52) U.S. Cl.
CPC ....... *H04B 7/18523* (2013.01); *H04L 5/0048* (2013.01); *H04L 12/14* (2013.01);
(Continued)

(58) Field of Classification Search
None
See application file for complete search history.

(56) References Cited

U.S. PATENT DOCUMENTS 8,769,531 B2 * 7/2014 Anderson ............. G06F 9/5077
718/1
8,804,494 B1 * 8/2014 Uberoy ............... H04L 41/0663
370/219

(Continued)

*Primary Examiner* — Sithu Ko
(74) *Attorney, Agent, or Firm* — Finnegan, Henderson, Farabow, Garrett & Dunner, LLP

(57) ABSTRACT

Systems and methods for providing mobile services are disclosed. In one implementation, an access point (AP) is provided, which may include a set of one or more base-station functions for use by a user equipment (UE) connected to the AP over a wireless communication interface. The one or more base-station functions may be configured to receive information from the UE. The AP may further include a set of one or more core-network functions configured to receive the information from the set of one or more base-station functions and a distributed portion of a service. The distributed portion of the service may be configured to receive the information from the one or more core-network functions and communicate the information to a corresponding cloud portion of the service running on a cloud platform. The service may be provided by a combination of the distributed portion and the cloud portion of the service. The distributed portion of the service may be further configured to receive a response from the cloud portion of the service based on processing performed by the cloud portion on the cloud platform.

40 Claims, 8 Drawing Sheets

US 11,683,087 B2
Page 2

Related U.S. Application Data

(60) Provisional application No. 62/164,949, filed on May 21, 2015, provisional application No. 62/165,018, filed on May 21, 2015, provisional application No. 62/163,624, filed on May 19, 2015, provisional application No. 62/163,743, filed on May 19, 2015, provisional application No. 62/158,959, filed on May 8, 2015.

(51) Int. Cl.

| | |
|---|---|
| *H04L 67/142* | (2022.01) |
| *H04L 67/02* | (2022.01) |
| *H04W 12/06* | (2021.01) |
| *H04W 76/10* | (2018.01) |
| *H04W 76/27* | (2018.01) |
| *H04L 41/5051* | (2022.01) |
| *H04W 4/60* | (2018.01) |
| *H04L 12/14* | (2006.01) |
| *H04W 12/08* | (2021.01) |
| *H04W 12/086* | (2021.01) |
| *H04W 12/088* | (2021.01) |
| *H04L 67/50* | (2022.01) |
| *H04W 72/52* | (2023.01) |
| *H04W 72/542* | (2023.01) |
| *H04L 41/026* | (2022.01) |
| *H04W 48/06* | (2009.01) |
| *H04W 72/0453* | (2023.01) |
| *H04W 48/16* | (2009.01) |
| *H04L 12/66* | (2006.01) |
| *H04L 41/12* | (2022.01) |
| *H04L 49/00* | (2022.01) |
| *H04L 67/10* | (2022.01) |
| *H04M 15/00* | (2006.01) |
| *H04W 4/24* | (2018.01) |
| *H04L 5/00* | (2006.01) |
| *H04W 56/00* | (2009.01) |
| *H04L 41/50* | (2022.01) |
| *H04L 61/4505* | (2022.01) |
| *H04W 88/08* | (2009.01) |
| *H04W 84/20* | (2009.01) |

(52) U.S. Cl.
CPC ............ *H04L 12/66* (2013.01); *H04L 41/026* (2013.01); *H04L 41/12* (2013.01); *H04L 41/5051* (2013.01); *H04L 49/70* (2013.01); *H04L 67/02* (2013.01); *H04L 67/10* (2013.01); *H04L 67/142* (2013.01); *H04L 67/535* (2022.05); *H04M 15/55* (2013.01); *H04M 15/66* (2013.01); *H04W 4/24* (2013.01); *H04W 4/60* (2018.02); *H04W 12/06* (2013.01); *H04W 12/08* (2013.01); *H04W 12/086* (2021.01); *H04W 12/088* (2021.01); *H04W 48/06* (2013.01); *H04W 48/16* (2013.01); *H04W 56/0015* (2013.01); *H04W 72/0453* (2013.01); *H04W 72/52* (2023.01); *H04W 72/542* (2023.01); *H04W 76/10* (2018.02); *H04W 76/27* (2018.02); *H04L 41/5087* (2013.01); *H04L 41/5096* (2013.01); *H04L 61/4505* (2022.05); *H04W 84/20* (2013.01); *H04W 88/08* (2013.01)

(56) References Cited

U.S. PATENT DOCUMENTS

| | | | | |
|---|---|---|---|---|
| 8,867,361 | B2* | 10/2014 | Kempf | H04L 43/0882 709/224 |
| 9,497,661 | B2* | 11/2016 | Kempf | H04W 24/02 |
| 9,882,733 | B2* | 1/2018 | Hua | H04L 69/16 |
| 9,924,483 | B2* | 3/2018 | John | H04L 61/4588 |
| 9,934,053 | B2* | 4/2018 | Anderson | G06F 9/45533 |
| 10,033,595 | B2* | 7/2018 | Sif | H04L 41/40 |
| 10,069,791 | B2* | 9/2018 | Bhaskaran | H04W 76/22 |
| 2012/0303835 | A1* | 11/2012 | Kempf | H04L 41/0695 709/235 |
| 2012/0304169 | A1* | 11/2012 | Anderson | G06F 9/45533 718/1 |
| 2013/0132854 | A1 | 5/2013 | Raleigh et al. | |
| 2014/0026194 | A1 | 1/2014 | Smith | |
| 2014/0259012 | A1* | 9/2014 | Nandlall | H04L 67/1097 718/1 |
| 2015/0063166 | A1* | 3/2015 | Sif | H04L 41/40 455/418 |
| 2015/0109995 | A1 | 4/2015 | Mathai et al. | |
| 2015/0173111 | A1* | 6/2015 | Agarwal | H04L 63/0884 370/329 |
| 2015/0230126 | A1 | 8/2015 | Raleigh et al. | |
| 2016/0330602 | A1 | 11/2016 | Das et al. | |
| 2017/0078927 | A1* | 3/2017 | Hahn | H04W 36/385 |
| 2017/0201850 | A1 | 7/2017 | Raleigh et al. | |

\* cited by examiner

CLOUD BASED ACCESS SOLUTION FOR ENTERPRISE DEPLOYMENT

CROSS-REFERENCE TO RELATED APPLICATIONS

This application is a continuation of U.S. application Ser. No. 15/150,374, filed May 9, 2016, which claims the benefits of U.S. Provisional Application Ser. No. 62/158,959, filed May 8, 2015, U.S. Provisional Application Ser. No. 62/163,624, filed May 19, 2015, U.S. Provisional Application Ser. No. 62/163,743, filed May 19, 2015, U.S. Provisional Application Ser. No. 62/164,949, filed May 21, 2015, and U.S. Provisional Application Ser. No. 62/165,018, filed May 21, 2015, which are each hereby incorporated by reference in their entireties.

FIELD OF INVENTION

The present invention relates to a wireless access infrastructure and, more particularly, to a novel cloud-based wireless access solution that can be integrated with enterprise deployments.

BACKGROUND

A conventional wireless access infrastructure includes a radio access network and a core network typically owned, managed, and controlled by a single wireless service provider called the wireless carrier. The radio access network, such as the Evolved Universal Terrestrial Radio Access (E-UTRA) defined in 3GPP's Long Term Evolution (LTE) standard, contains the network and equipment for connecting user equipment (UE), such as mobile devices and computers having wireless connectivity, to the core network. The core network, such as the Evolved Packet Core (EPC) defined in the LTE standard, contains the network and equipment for providing mobile voice and data services within the carrier's service environment and to external networks, such as the Internet, and other carriers' networks.

The LTE standard, for example, defines specific network nodes and communication interfaces for implementing the E-UTRA and EPC. According to the standard, the E-UTRAN includes one or more eNodeB (base stations) configured to communicate with UEs and the EPC core network. The EPC includes at least a Mobility Management Entity (MME), which manages session states, authentication, paging, and mobility and roaming functions; a packet-data gateway (PGW), which sends/receives data packets to/from an external data network, such as the Internet; a Serving Gateway (SG-W), which routes data packets between the PGW and an eNodeB; and a Policy and Charging Rules Function (PCRF), which manages users, applications, and network resources based on carrier-configured rules.

FIG. 1 is a schematic block diagram of an exemplary LTE wireless access infrastructure 1000 including an E-UTRAN 1100 and an EPC 1200. The E-UTRAN 1100 includes at least one eNodeB 1102 configured to communicate with UEs 1002A and 1002B over wireless links. The EPC 1200 contains network nodes including a MME 1202, SG-W 1204, PGW 1206, and PCRF 1208. While the exemplary infrastructure 1000 is depicted with only one PGW 1206 connected to an external packet-data network, such as the Internet, the EPC 1200 alternatively may contain multiple PGWs, each connecting the EPC 1200 to a different packet data network. The MME 1202, SG-W 1204, PGW 1206, and PCRF 1208 are implemented in software on dedicated hardware (computers) 1302, 1304, 1306, and 1308. The dedicated hardware may be a single server or a cluster of servers. The LTE network nodes 1202, 1204, 1206, and 1208 are typically implemented as monolithic software modules that execute on their respective dedicated hardware 1302, 1304, 1306, and 1308.

The LTE standard not only defines functionalities in ach of the MME 1202, SG-W 1204, PGW 1206, and PCRF 1208, but also defines the communication interfaces between them. The LTE standard defines several interfaces including, for example, an "S1-MME" interface between the eNodeB 1102 and the MME 1202, an "S1-U" interface between the eNodeB 1102 and the SG-W 1204, an "S11" is an interface between the MME 1202 and the SG-W 1204, an "S5" interface between the SG-W 1204 and the PGW 1206, and a "Gx" interface between the PCRF 1208 and the PGW 1206. The exemplary infrastructure 1100 illustrates these standardized interfaces.

Because the communication interfaces and network nodes in the LTE wireless access infrastructure 1000 are standardized, they ensure compatibility between the MME 1202, SG-W 1204, PGW 1206, and PCRF 1208, even when those nodes are programmed and/or developed by different manufacturers. Such standardization also ensures backward compatibility with legacy versions of any nodes that may have been previously deployed in the infrastructure 1000.

The need for multiple, dedicated network nodes makes deployment of an LTE wireless access infrastructure, such as the exemplary infrastructure 1000, costly and complex. Specifically, IP-centric enterprise solutions with typical web-based interfaces and protocols do not generally work seamlessly with the 3GPP-based standardized functions and interfaces. For example, the interfaces of a typical Cloud-based service in the enterprise say, based on HTTPS are not easy to connect to 3GPP nodes with standardized interfaces such as S1 over SCTP. The standardized nodes and interfaces in conventional wireless access infrastructures also make scaling the infrastructure challenging. For example, it may be difficult to deploy only a subset of the functions and/or communication interfaces defined by the standard. Furthermore, conventional wireless access infrastructures may not utilize resources efficiently within the infrastructure. In some conventional wireless access solutions, for example, a UE may be denied voice and/or data services because one of the network nodes is unable to handle an additional user even though other nodes are not being fully utilized. In other words, the capacity of the conventional infrastructure may be limited by the capacity of each node.

SUMMARY

The invention provides a novel cloud-based wireless access system and method using services. The disclosed embodiments of the invention may be configured to provide one or more functions of a conventional wireless access infrastructure, such as an E-UTRA radio access network and/or EPC core network defined in the LTE standard. The functions provided by the services may include, for example, an authentication function, a policy function, and a location function, among others, which in the past would have been implemented by executing monolithic applications on dedicated hardware (e.g., MME, SG-W, PGW, and PCRF) via standardized interfaces (e.g., S11 and S1-MME). Each service may include both a cloud portion and a distributed portion, whereby the cloud portion may communicate with its corresponding distributed portion using known cloud interfaces and protocols, such as HTTPS/TLS. As a result, the disclosed embodiments may use less hardware, fewer interfaces, and are more configurable than prior ireless access infrastructures.

In accordance with the disclosed embodiments, each service may provide radio access network and/or core network functions in addition to functions related to one or more enterprise applications. An enterprise application in this context provides one or more services within an enterprise network, such as a network in a corporate, governmental, academic, non-profit, or other organization or entity. Advantageously, for example, an authentication service may provide the authentication functions of a standards-based 3GPP-LTE ATTACH process and, in addition, may provide separate enterprise-specific authentication functions, such as Single-Sign-On and/or LDAP authentication in an integrated way. Unlike conventional solutions, the novel cloud-based wireless access infrastructure provides a platform in which services may be used to efficiently integrate standardized wireless network functions and services with enterprise functions and services not defined in the standard.

An access point (AP) may be used to provide wireless network access to one or more UEs in an enterprise network in accordance with the disclosed embodiments. To that end, the AP may provide a set of one or more eNodeB functions and a set of one or more EPC functions for each UE in communication with the AP. In some embodiments, the one or more eNodeB functions may be configured to receive information from the UE and pass that information to the one or more EPC functions allocated for the UE. The AP may include a distributed portion of a service, such as an authentication service, configured to receive the information from the one or more EPC functions and communicate the information to a corresponding cloud portion of the service running on a cloud platform. The cloud portion of the service on the cloud platform may return a response, such as an authentication result, to its distributed portion on the AP, for example, based on the result of performing an enterprise authentication process and a carrier authentication process. In the case of an authentication service, for example, the cloud portion of the service may forward the authentication result to the one or more EPC functions for further processing. Additionally, the cloud portion of the service may cause a network device (such as a network router or switch) to be configured in a software-defined networking architecture, based on the authentication result.

In accordance with some of the disclosed embodiments, a method performed by an AP executing a set of one or more base-station functions for use by a UE, a set of one or more core-network functions, and a distributed portion of a service, may include: receiving, by the set of one or more base-station functions, information from the UE; receiving, by the set of one or more core-network functions, the information from the set of one or more base-station functions; receiving, by the distributed portion of the service, the information from the one or more core-network functions; communicating the information to a corresponding cloud portion of the service running on a cloud platform, wherein the service is provided by a combination of the distributed portion and the cloud portion of the service; and receiving a response from the cloud portion of the service based on processing performed by the cloud portion on the cloud platform. In some embodiments, the distributed portion of the service may send the response to the set of one or more core-network functions, and the set of one or more core-network functions may send the response to the set of one or more base-station functions. Subsequently, the set of one or more base-station functions may send the response to the UE. Persons of ordinary skill in the art will appreciate that the cloud-based wireless access infrastructure disclosed herein may contain other distributed and cloud portions of services, in addition to or in place of the exemplary authentication service described in the illustrative embodiments below.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION OF DISCLOSED EMBODIMENTS

Figure 1:
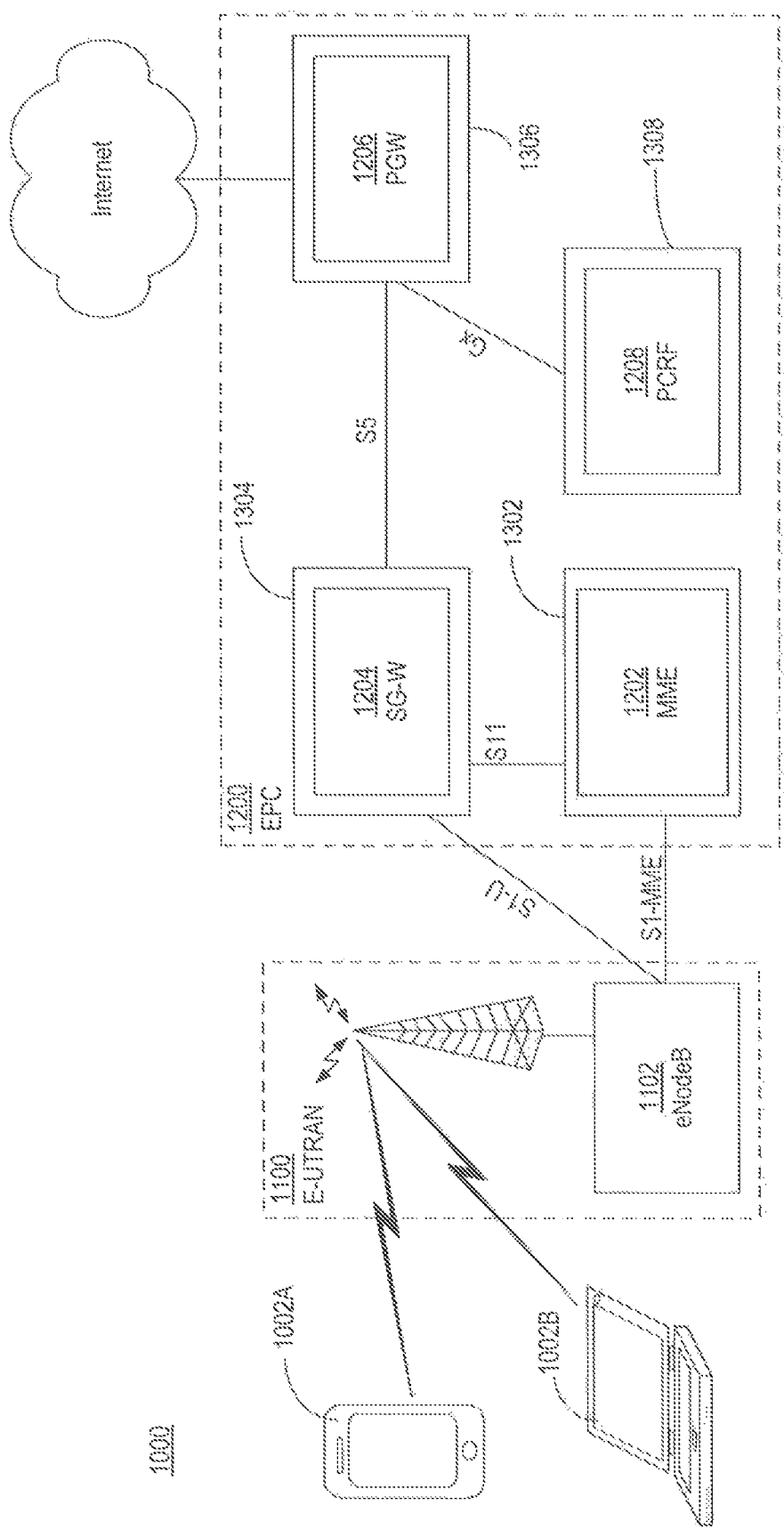
FIG. 1 is a schematic block diagram of an example conventional LTE wireless infrastructure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the nodes and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Figure 2:
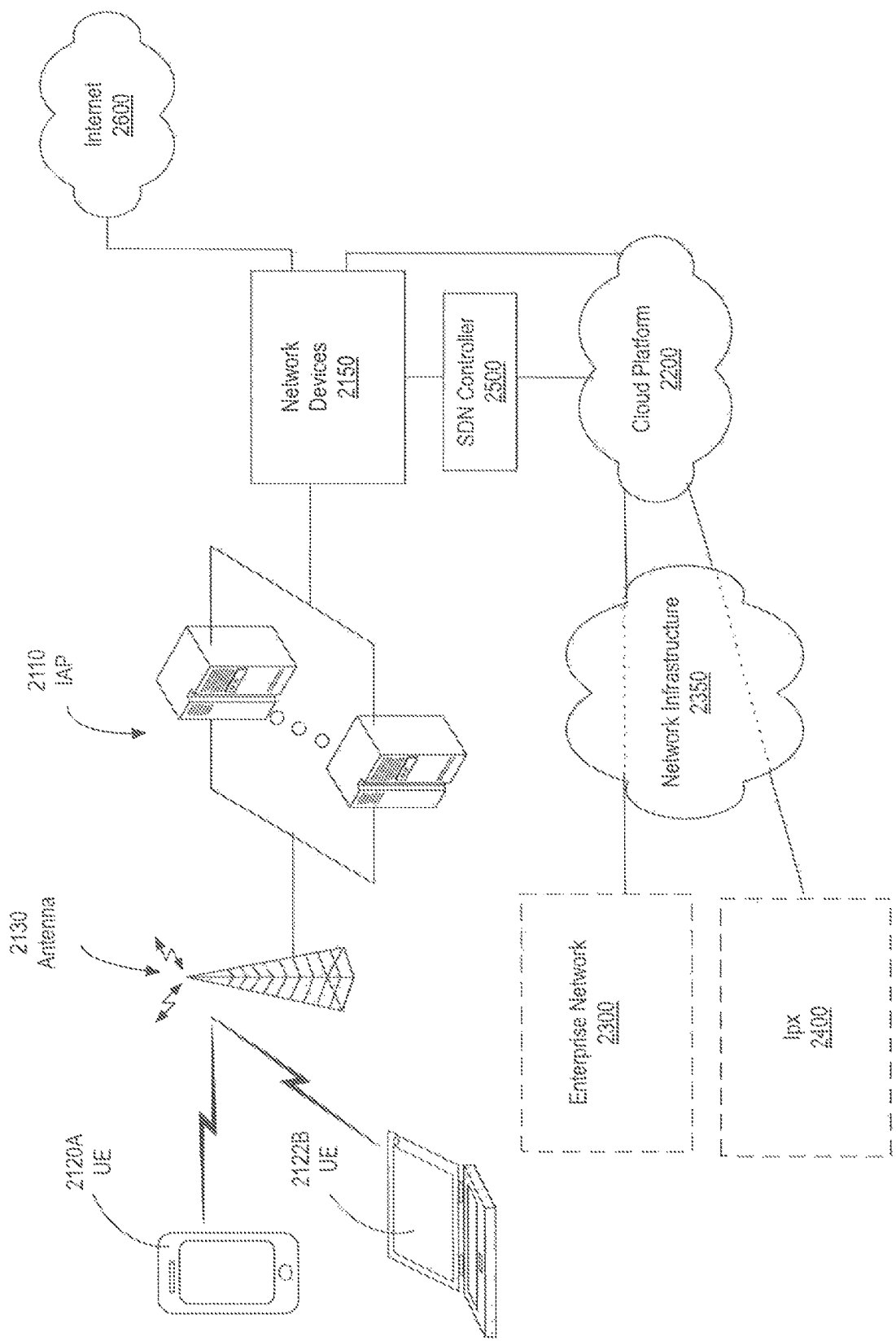
FIG. 2 illustrates a schematic block diagram of an exemplary cloud-based wireless access infrastructure in accordance with the disclosed embodiments.

FIG. 2 illustrates a block diagram of an exemplary cloud-based wireless access infrastructure 2000 in accordance with the disclosed embodiments of the invention. The exemplary cloud-based wireless access infrastructure 2000 may provide one or more access points (AP) 2110 through which users may communicate to access standardized wireless voice and/or data services, such as defined in the LTE standard, as well as enterprise-level applications and services that would be available to the user in an enterprise network of a corporate, governmental, academic, non-profit, or other organization or entity. For example, in accordance with the disclosed embodiments, an organization may deploy an AP 2110 in a building to provide its employees in that building with wireless access to both LTE and enterprise-level services.

The exemplary cloud-based wireless access infrastructure 2000 includes at least first and second UEs 2120A-B, one or more antennas 2130, one or more APs 2110, one or more network devices 2150, a network controller 2500, a cloud platform 2200, an enterprise network 2300, and an internet protocol exchange (IPX) 2400.

As shown in FIG. 2, each of the UEs 2120A-B may communicate with the AP 2110 through the antenna 2130 electrically coupled to the AP 2110. While a single antenna is shown in FIG. 2, the cloud-based wireless access infrastructure 2000 may alternatively employ multiple antennas, each electrically coupled to the AP 2110. In some embodiments, one or more antennas 2130 may connect to the AP 2110 and other antennas may connect to different APs in the same wireless access infrastructure. The AP 2110 may be implemented on one or more computer systems. The AP 2110, for example, may execute one or more software programs on a single computer or on a cluster of computers. Alternatively, the AP 2110 may be implemented as one or more software programs executing on one or more virtual computers.

In the disclosed embodiments, the AP 2110 may be connected to one or more network devices 2150, which may be configured to forward data between the UEs 2120A-B (via the AP 2110) and external data networks, such as the Internet 2600 and/or the cloud platform 2200. The network devices 2150 may include, for example, a hub, switch, router, virtual switches/router, distributed virtual switch (vSwitch), DHCP server, encrypted tunnel end-point manager and/or any combination thereof.

In some embodiments, at least a subset of the network devices 2150 may be dynamically configured by a software-defined networking (SDN) controller. For example, as shown in FIG. 2, a SDN controller 2500 may configure one or more layer-two devices (e.g., switches) or layer-three devices (e.g., routers) in the set of network devices 2150, such that data packets or frames may be routed, processed, and/or blocked at the network devices based on various parameters, such as, but not limited to, the origin or destination of the data, type of data, and/or carrier or enterprise policies. Additionally, or alternatively, the SDN controller 2500 may configure at least a subset of the network devices 2150 to provide different qualities of service (QoS) to different UEs based on one or more policies associated with each UE. For example, the SDN controller 2500 may configure the one or more network devices 2150 to ensure that the UE 2120A, which may be associated with a business customer, receives a higher QoS compared with the UE 2120B, which may be associated with a non-business customer.

In some embodiments, the SDN controller 2500 may configure one or more of the network devices 2150 based on data (including, for example, messages, notifications, instructions, measurements, authorizations, approvals, or other information) received from one or more services running in the cloud-based wireless access infrastructure 2000. For example, the SDN controller 2500 may receive instructions on how and which of the network devices 2150 to configure from a service on the cloud platform 2200.

In accordance with the disclosed embodiments, the cloud platform 2200 may communicate with the enterprise network 2300 and/or the IPX 2400. In some embodiments, the cloud platform 2200 may include direct connections to the enterprise network 2300, as shown in FIG. 2. Alternatively, the cloud platform 2200 may employ indirect connections (not shown in the figures), such as using the Internet 2600 (via the network device 2150), to communicate with the enterprise network 2300. For example, the cloud platform 2200 may communicate with the enterprise network 2300 through the Internet 2600 using a tunneling protocol or technology, such as the IPSec protocol, or may communicate with an LTE EPC 1200 node of another carrier via the IPX 2400 using one or more standardized interfaces, such as the Gy, Gz, Gx, and S6a interfaces as defined in the LTE standard. In FIG. 2, the enterprise network 2300 is shown to be separate, but electrically coupled, with the cloud platform 2200. In other embodiments (not shown), however, the enterprise network 2300 may be implemented on the cloud platform 2200.

Figure 3:
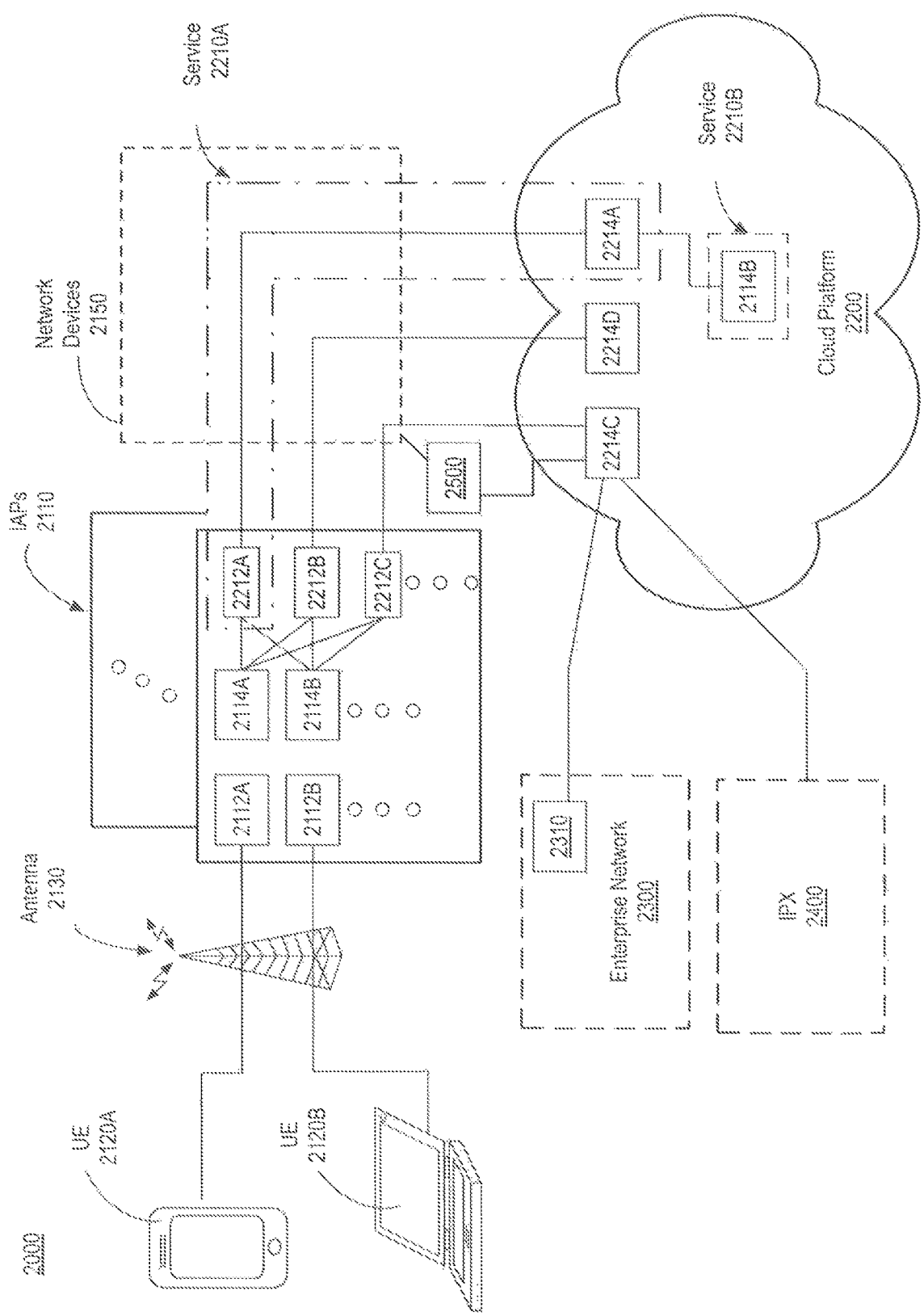
FIG. 3 illustrates a schematic block diagram of the exemplary cloud-based wireless access infrastructure of FIG. 2 showing additional implementation details in accordance with the disclosed embodiments.

FIG. 3 illustrates another illustrative block diagram of the exemplary cloud-based wireless access infrastructure 2000 of FIG. 2 in accordance with the disclosed embodiments. FIG. 3 illustrates additional implementation details of the AP 2110, cloud platform 2200, and enterprise network 2300 that may be used in the exemplary cloud-based wireless access infrastructure 2000.

As shown in FIG. 3, the AP 2110 may be configured to execute one or more instances of a software program configured to implement functions of a base station and one or more instances of a software program configured to implement functions of a core network. For example, in FIG. 3, eNodeB Functions 2112A-B represent at least two instances of a software program configured to provide at least a subset of functions of an LTE base station, such as the eNodeB 1102. Similarly, EPC Functions 2114A-B represent at least two instances of a software program configured to provide at least a subset of functions of an LTE core network, such as the EPC 1200. In some embodiments, the AP 2110 may be configured to execute one or more instances of a single software program configured to implement both the eNodeB Functions and EPC Functions.

In some embodiments, a fixed number of instances of eNodeB Function 2112A-B and a fixed number of instances of EPC Function 2114A-B may be instantiated and maintained in the AP 2110. The number of instances of the eNodeB Functions 2112A-B and the number of instances of the EPC Functions 2114A-B may be the same or different. In some embodiments, when a UE 2120A wirelessly connects to the AP 2110, an existing instance of eNodeB Function 2112A and an existing instance of EPC Function 2114A may be assigned to handle communications with the UE 2120A. In other embodiments (e.g., when existing instances of eNodeB Function 2112A and EPC Function 2114A are unavailable to assign to the UE 2120A), the AP 2110 may instantiate a new instance of an eNodeB Function and a new instance of an EPC Function for the UE 2120A. In alternative embodiments, the AP 2110 may dynamically instantiate and assign a new instance of eNodeB Functions and a new instance of EPC Functions for each UE.

According to the disclosed embodiments, an instance of the eNodeB Functions 2112A may be configured to provide all radio-related functions needed to send/receive data to/from a UE 2120A. For example, an instance of eNodeB Function 2112A may perform at least a subset of functions of an eNodeB as defined in the LTE standard including, but not limited to, functions of a physical (PHY) layer, media access control (MAC) layer, radio resource management (RRM), and/or self-organizing network (SON). Functions of a PHY layer (as defined in the LTE standard) may include, for example, channel coding, rate matching, scrambling, modulation mapping, layer mapping, pre-coding, resource mapping, orthogonal frequency-division multiplexing (ODFM), and/or cyclic redundancy checking (CRC). Functions of MAC layer (as defined in the LTE standard) may include, for example, scheduling, multiplexing, and/or hybrid automatic repeat request (HARQ) operations. Functions of RRM (as defined in the LTE standard) may include, for example, allocating, modifying, and releasing resources for transmission over the radio interface between a UE 2120A and the AP 2110. Functions of a SON (as defined in the LIE standard) may include, for example, functions to self-configure, self-optimize, and self-heal the network devices 2150. Alternatively, or additionally, an instance of eNodeB Function 2112A may perform at least a subset of functions of an element equivalent to an eNodeB in other wireless standards, such as, but not limited to, functions of a base transceiver station (BTS) as defined in the GSM/EDGE standard or a NodeB as defined in the UMTS/HSPA standard. In some embodiments, a UE 2120A may wirelessly connect to the AP 2110 in the 3.5 GHz shared band.

According to the disclosed embodiments, an instance of eNodeB Function 2112A may be further configured to send/receive data to/from a corresponding instance of EPC Function 2114A. However, in contrast with the conventional wireless access infrastructure 1000 of FIG. 1 that only uses standardized communication interfaces, an instance of the eNodeB Function 2112A in the AP 2110 may communicate with an instance of the EPC Function 2114A also executing in the AP 2110 using any interface or protocol. Because the eNodeB and EPC Functions execute on the same AP 2110, they do not need to be constrained to standardized communication interfaces. Instances of eNodeB Functions 2112A and EPC Functions 2114A may communicate with one another using, among other things, language-level method or procedure calls, remote-procedure call (RPC), Simple Object Access Protocol (SOAP), or Representational State Transfer (REST).

In accordance with the disclosed embodiments, an instance of the EPC Functions 2114A may be configured to provide at least some functions of a core network. For example, the exemplary instance of EPC Function 2114A may include functions such as, but not limited to, at least a subset of functions of the MME 1202, PGW 1206, SG-W 1204, and/or PCRF 1208 of EPC 1200 as defined in the LTE standard. An instance of the EPC Function 2114A, for example, may include a Mobility Management Function (MMF) which may perform at least a subset of functions of the MME 1202 (e.g., authentication functions) and the Optimized Packet Function (OPF) which may perform at least a subset of functions of the SG-W 1204 node and/or the PGW 1206 node (e.g., forwarding packets between the UE 2120A and one or more external data networks, such as the Internet 2600 and IPX 2400 via the appropriate Cloud service). In some embodiments, the instance of the EPC Functions 2114A may be configured to provide all functions of a core network.

In contrast with the MME 1202 node defined in the LTE standard, the MMF executing in the AP 2110 may communicate with the OPF using any protocol because both functions are implemented in the same EPC Function 2114A. On the other hand, in the EPC 1200, the MME 1202 node is connected to the SG-W 1204 using the standardized interface S11 and the SG-W 1204 is connected to the PGW node using the standardized interfaces S5/S8. In the disclosed embodiments, for example, the MME 1202 and the OH node may communicate with one another using language-level methods or procedure calls, RPC, SOAP, or HTTP/REST.

Advantageously, an instance of eNodeB Function 2112A and/or EPC Function 2114A may implement the functions (or a subset of functions) of the eNodeB 1102 and/or the EPC 1200 using one or more services in accordance with the disclosed embodiments. For example, a service 2210A may include a distributed portion 2212A and a cloud portion 2214A. The distributed portion 2212A may be implemented within the AP 2110 and may provide application programming interfaces (APIs) that may be accessible by instances of eNodeB Functions 2112A-B and/or EPC Functions 2114A-B. The cloud portion 2214A of the service 2210A may be utilized by instances of the eNodeB Functions 2112A-B and/or EPC Functions 2114A-B through the associated distributed portion 2212A running on the AP 2110.

Unlike the conventional wireless access infrastructure 1000, the exemplary cloud-based wireless access infrastructure 2000 may utilize available resources more efficiently, in part, because the services (e.g., 2110A-B) share the same pool of cloud-platform resources, and further, the cloud platform 2200 may dynamically reallocate resources to and from each service based on the service's resource needs. For example, in the cloud-based wireless access infrastructure 2000, the cloud platform 2200 may dynamically allocate computing resources, such as memory and CPU time, to various services based on each service's real-time demand for such resources. In contrast, a predetermined amount of resources would be dedicated to each node in the conventional wireless access infrastructure 1000, and these resources cannot be distributed among the other nodes dynamically. Therefore, situations may exist in the conventional wireless access infrastructure 1000 where the UE 1002A is denied service because one of the nodes (e.g., the MME 1202 of the EPC 1200) does not have sufficient amount of resources available for the UE 1002A, even when resources of other nodes have not been fully utilized.

The cloud-based wireless access infrastructure 2000 also has the advantage of enabling simplified network implementations relative to the conventional wireless access infrastructure 1000. Because the AP 2110 in the disclosed embodiments is configured to implement one or more eNodeB Functions and EPC Functions, which conventionally were not deployed at the same server, the AP may leverage optimizations that previously were not available, such as combining the implementations of one or more of the eNodeB Functions and EPC Functions. In the context of LTE, for example, optimizations that combine one or more base-station and/or core-network functions in the AP, or that enable other optimizations in terms of resource management and/or allocations, may provide simplified LTE network implementations that were previously not possible. More generally, the cloud-based wireless access solution herein may be advantageously used to simplify and optimize implementations of various types of wireless access networks and is not limited to LTE-based solutions.

Moreover, the capacity of the exemplary cloud-based wireless access infrastructure 2000 may be simpler and easier to scale up or down compared with the capacity of the conventional wireless access infrastructure 1000. For example, the capacity of the cloud-based wireless access infrastructure 2000 may be increased by adding more resources available to the cloud platform 2200 and/or to the AP 2110. In contrast, capacities of multiple EPC 1200 nodes may need to be increased to increase the capacity of the conventional wireless access infrastructure 1000.

According to the disclosed embodiments, the cloud portion 2214A of the service 2210A may be implemented on the cloud platform 2200. Examples of cloud platforms include, Eucalyptus (an open-source cloud platform), Open Stack (an open-source cloud platform), and Amazon Web Service (AWS). In some embodiments, the cloud portion 2214A of the service 2210A may be stateless and communicate with the distributed portion 2212A of the service 2210A using a protocol supported by the cloud platform 2200 (e.g., HTTP/REST and SOAP are supported by AWS). In some disclosed embodiments, the cloud portion 2214A of the service 2210A may utilize a cloud portion 221413 of another service 2210B. In other disclosed embodiments, a cloud portion 2214C of a service 2210C may communicate with a conventional core network node in IPX 2400 by a standardized interface. In some embodiments, the cloud portion 2214C of the service 2210C may communicate with a server/application (e.g., Enterprise Identity and Authentication Application (EIAA) 2310) of the enterprise network 2300. And in some embodiments, the cloud portion 2214C of the service 2210C may communicate with the SDN controller 2500 to provide instructions on how and which network devices of the network devices 2150 to configure/reconfigure. In some embodiments, a service may have a cloud portion only (i.e., without corresponding distributed portions), such as the cloud portion 2114B of the service 2210B.

In some embodiments of the invention, the distributed portion 2212A of the service 2210A, in addition to exposing APIs to instances of eNodeB Functions 2112A-B and/or EPC Functions 2114A-B, may provide additional functions, such as caching. For example, when an API of the distribute portion 2212A of the service 2210A is being utilized to request data, the distributed portion 2212A, prior to communicating with its associated cloud portion 2214A to obtain the requested data, may determine whether the data is cached and/or whether the cached data is still valid.

Figure 4:
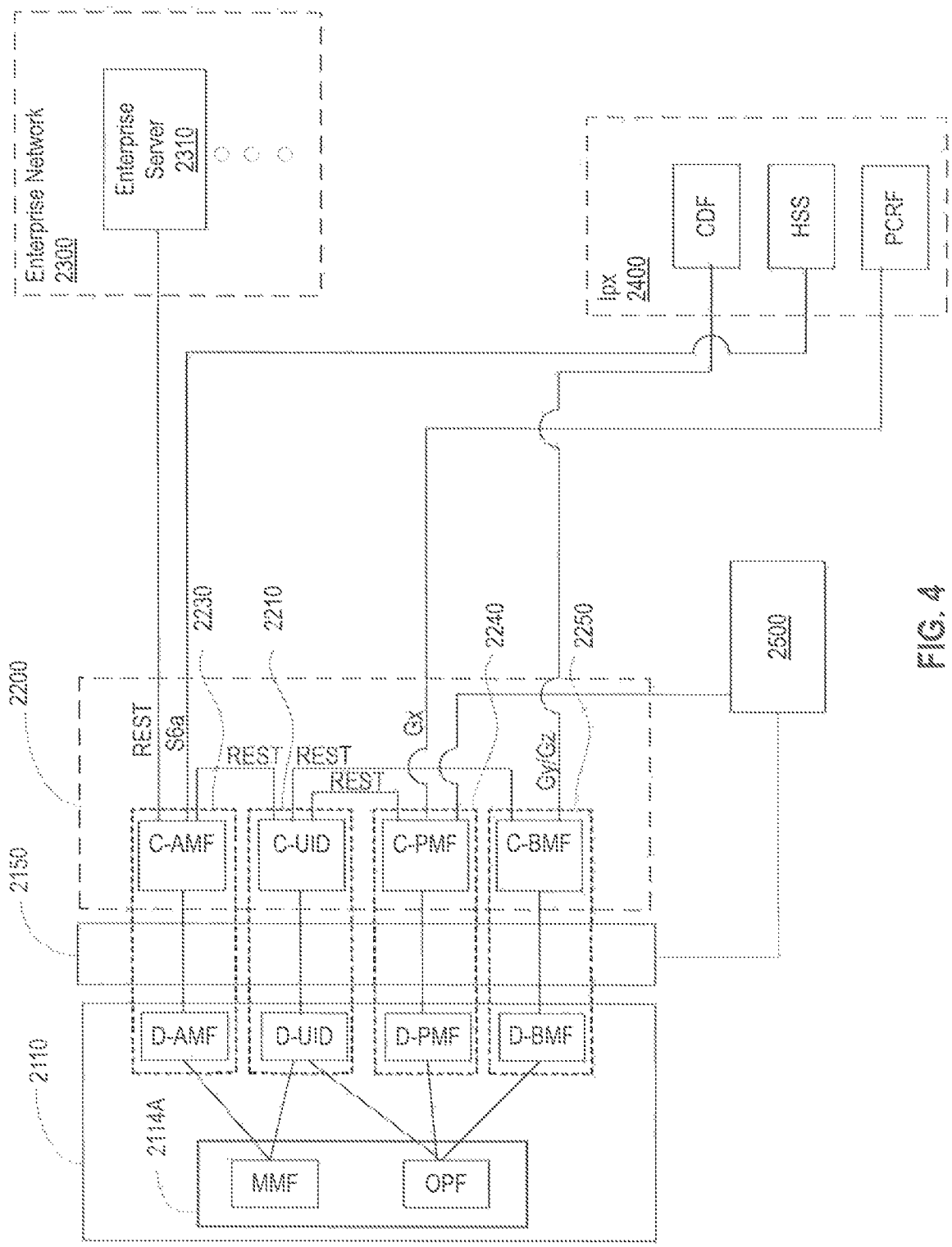
FIG. 4 illustrates a schematic block diagram of the exemplary cloud-based wireless access infrastructure of FIGS. 2 and 3 showing additional implementation details in accordance with the disclosed embodiments.

FIG. 4 illustrates a block diagram of the exemplary cloud-based wireless access infrastructure 2000 of FIGS. 2 and 3 in accordance with the disclosed embodiments. FIG. 4 illustrates additional implementation details that may be included in the exemplary cloud platform 2200, including various examples of services that may be used by instances of the EPC Functions 2114A-B. The exemplary services include, for example, User ID Service 2210, Operation, Administration, and Management Service 2220, Authorization Management Service 2230, and Policy Management Service 2240.

The Authorization Management Service 2230 may be configured to authenticate a UE 2120A by communicating with the EIAA 2310 and/or one or more authentication nodes (e.g., HSS nodes) of external carriers in the IPX 2400. As shown in FIG. 4, the Authorization. Management Service 2230 may include a distributed portion ("D-AMF") and a corresponding cloud portion ("C-AMF"), which is configured to communicate with the D-AMF. In some embodiments, the D-AMF may be stateless and implemented as a software program executing in the AP 2110, separate from the instances of software program(s) executing for the EPC Functions 2114A-B and eNodeB Functions 2112A-B, but still accessible by at least some of the instances of EPC Functions and eNodeB Functions. In some embodiments, communications between the D-AMF and the C-AMF may be encrypted, for example, using TLS or IPSec.

In accordance with some embodiments, the Authorization Management Service 2230 may authenticate the UE 2120A by using authentication and key agreement procedures, such as Evolved Packet System Authentication and Key Agreement (EPS AKA) and/or XOR-based algorithms, which may create keying materials for the RRC (Radio Resource Control) signaling, NAS (Non-Access Stratum) signaling, ciphering keys, and integrity keys. An authentication and key agreement procedure may be initiated, for example, after an LTE ATTACH request from the UE 2120A.

In some embodiments, an LTE ATTACH request (the first step of an ATTACH procedure) may be sent from the UE 2120A to the AP 2110 when the UE 2120A is powered on and during the UE 2120A's initial access to the AP 2110. In some embodiments, the AP 2110 and the UE 2120A may use IMSI-based or GUTI-based ATTACH procedures, and an IP address (IPv4/IPv6) may be provided to the UE 2120A during the ATTACH procedure. In some embodiments, an instance of the eNodeB Function 2112A may forward information typically contained in an ATTACH Request message (as defined in the LTE standard) to the MMF of the corresponding instance of EPC Function 2114A. At least a portion of the information contained in the ATTACH Request message may be received from the UE 2120A. In some embodiments, the instance of the eNodeB Function 2112A may forward additional information such as the Selected Network, Tracking Area Identity (TAI), and EUTRAN Cell Global Identifier (ECGI) of the cell from where it received the message to the MMF of the corresponding instance of EPC Function 2114A.

FIG. 4 further shows services that enable instances of EPC Function 2114A-B to provide UEs 2120A-B with services that are not defined in the LTE standard. These additional services may include, for example, Billing Management Service 2250. According to the disclosed embodiments, the Billing Management Service (BMS) 2250 includes a distributed portion ("D-BMF") and a corresponding cloud portion ("C-BMF"), and may provide online and/or offline charging capabilities to an instance of the EPC Function 2114A. For example, an instance of the EPC Function 2114A may use APIs in the D-BMF to request the C-BMF to determine whether a UE 2120A is granted to use a network resource based on the account information (e.g., amount of data and minutes pre-paid by the user of the UE 2120A) and based on the network usage information (e.g., the amount of data or minutes currently used by the UE 2120A). In some embodiments, the C-BMF may receive the account information from the cloud portion of the User ID Service 2210, using for example HTTP/REST. In another example, an instance of the EPC Function 2114A may use APIs in the D-BMF to send the C-BMF information relating to the UE 2120A's network usage. In some embodiments, the C-BMF may transfer this information to an internal Billing Domain for the purposes of billing the user of the UE 2120A, inter-operator accounting, and/or monitoring usage of network resources.

In some embodiments, the C-BMF may send and/or receive network usage information to/from another carrier such that the UE 2120A's internal and external network usage may be tracked and/or controlled. For example, the C-BMF may communicate with a Charge Data Function (CDF) node of the carrier's EPC 1200 network through the IPX 2400 using standardized interfaces Gy and Gz.

As noted previously, the cloud platform 2200 may further include services having cloud portions only (i.e., without corresponding distributed portions), such as the cloud portion 2114B of the service 2210B. These services may include, for example, Integrated Authentication Management (IAM) Service, Skype Service, and Policy Service, and these types of services may communicate with other cloud portions of services. In some embodiments, the cloud platform 2200 may further include Emergency Management Service, Lawful Intercept Service, Roaming Management Service, and Paging Optimization Service, to provide additional examples.

Figure 5A:
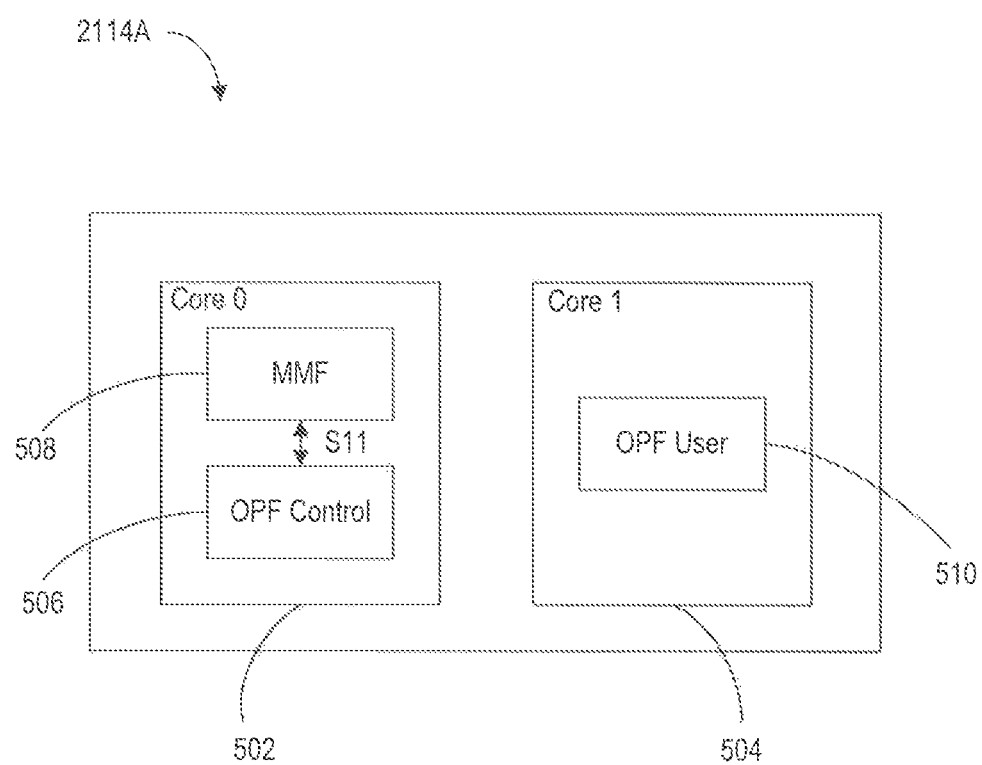
FIGS. 5A-5B illustrate exemplary instances of an EPC Function that may be implemented in accordance with the disclosed embodiments.
Figure 5B:
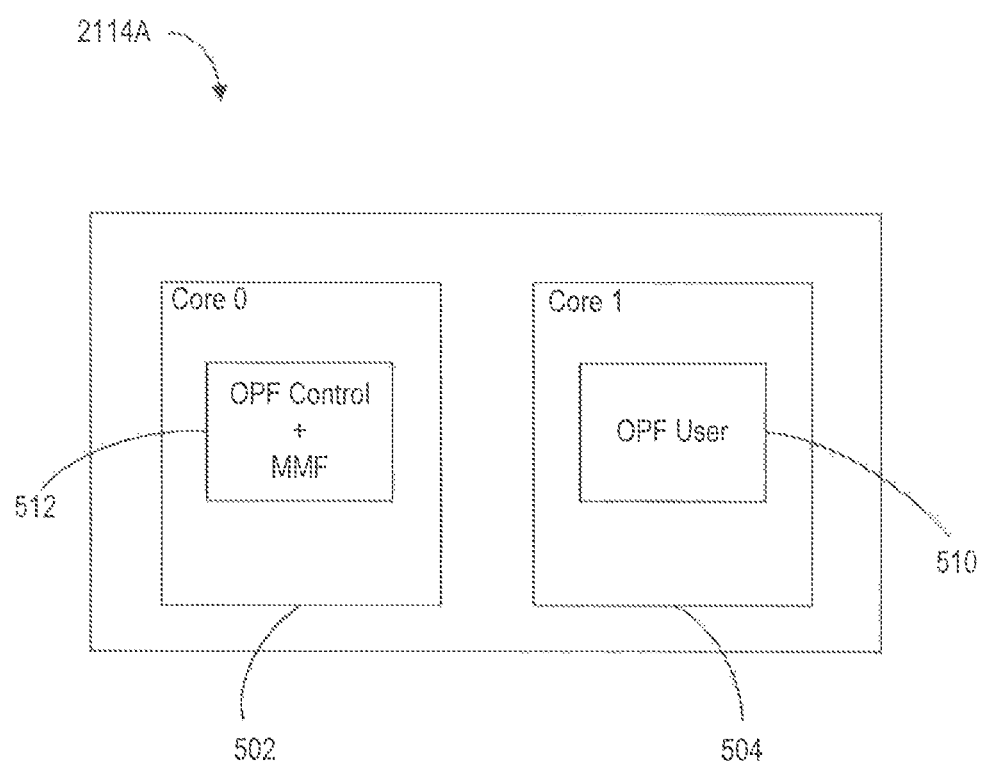

FIGS. 5A-5B illustrate exemplary instances of the EPC Function 2114A of FIG. 4 in accordance with the disclosed embodiments. As noted previously, an instance of the EPC Function 2114A, for example, may include a MMF which may perform at least a subset of functions of the MME 1202 (e.g., authentication functions) and the OPF which may perform least a subset of functions of the SG-W 1204 node and/or the PGW 1206 node (e.g., forwarding packets between the UE 2120A and one or more external data networks, such as the Internet 2600 and IPX 2400 via the appropriate Cloud service).

In some embodiments, the OPF may be implemented using separate control-plane and user-plane portions. The OPF control-plane portion may perform at least some of the control and management functions of the SG-W 1204 and/or PGW 1206 nodes, and the OPF user-plane portion may perform data routing and processing functions of the SG-W 1204 and/or PGW 1206. The control-plane functions of the SG-W 1204 and/or PGW 1206 may include, for example, functions to communicate with services on a cloud platform. User-plane functions of the SG-W 1204 and/or PGW 1206 may include, for example, functions that create or process data packets (e.g., TCP, UDP, and/or IP) and communicate data packets to a eNodeB and/or external networks. In some embodiments, the user-plane portion of the OPF may include the user-plane functions of the PGW 1206 without also including user-plane functions of the SG-W 1204. In such embodiments, the OPF user-plane portion may communicate with external networks while bypassing the user-plane functions of the SG-W 1204 node.

In some embodiments, as shown in FIG. 5A, the MMF 508 and the OPF control-plane portion 506 may be executed on a first processor core 502 of the AP 2110, and the OPF user-plane portion 510 may be executed on a second processor core 504 of the AP 2110. In this way, the AP 2110 may reduce signaling overhead between the MMF 508 and the OPF control-plane portion 506 executing in the first processor core. For example, the MMF 508 may communicate with the OPF control-plane portion 506 in the first processor core 502 using, for example, the s11 interface protocol. The MMF 508 and the OPF control-portion 506 may communicate with the OPF user-plane portion 510 using a proprietary protocol.

Alternatively, as shown in FIG. 5B, a single function 512 implementing both the OPF control-plane portion 506 and the MMF 508 (e.g., as a single binary application) may be executed on the first processor core 502 of the AP 2110, and the OPF user-plane portion 510 may be executed on the second processor core 504 of the AP 2110, which may further reduce the signaling overhead between the OPF control-plane portion 506 and the MMF 508 (e.g., by eliminating use of the s11 interface protocol).

In some embodiments, the OPF user-plane portion ay use one or more TUN devices for communicating with external networks, eNodeB, and/or the OPF control-plane portion. For example, the OPF user-plane portion in the AP 2110 may include, or be connected to, a first TUN device for handling data packets to/from external networks. Additionally, the OPF user-plane portion in the AP 2110 may include, or be connected to, second and/or third TUN devices for handling data packets to/from an eNodeB. The use of TUN device(s) may reduce the memory and CPU usage in the AP 2110. Alternatively, the OPF user-plane portion in the AP 2110 may communicate with an eNodeB using UDP-based sockets. And in some embodiments, the OPF user-plane portion may utilize Intel's NTL, socket libraries, leveraging an Inter-Cluster Communication (ICC) memory model to communicate with an eNodeB and/or external networks. In accordance with the disclosed embodiments, persons skilled in the art will appreciate that the AP 2110 may implement the OPF and MMF functions in various ways that may optimize resource usage in the AP 2110, for example, by reducing the amount of signalling or processing in the AP, compared with conventional EPC implementations.

Figure 6:
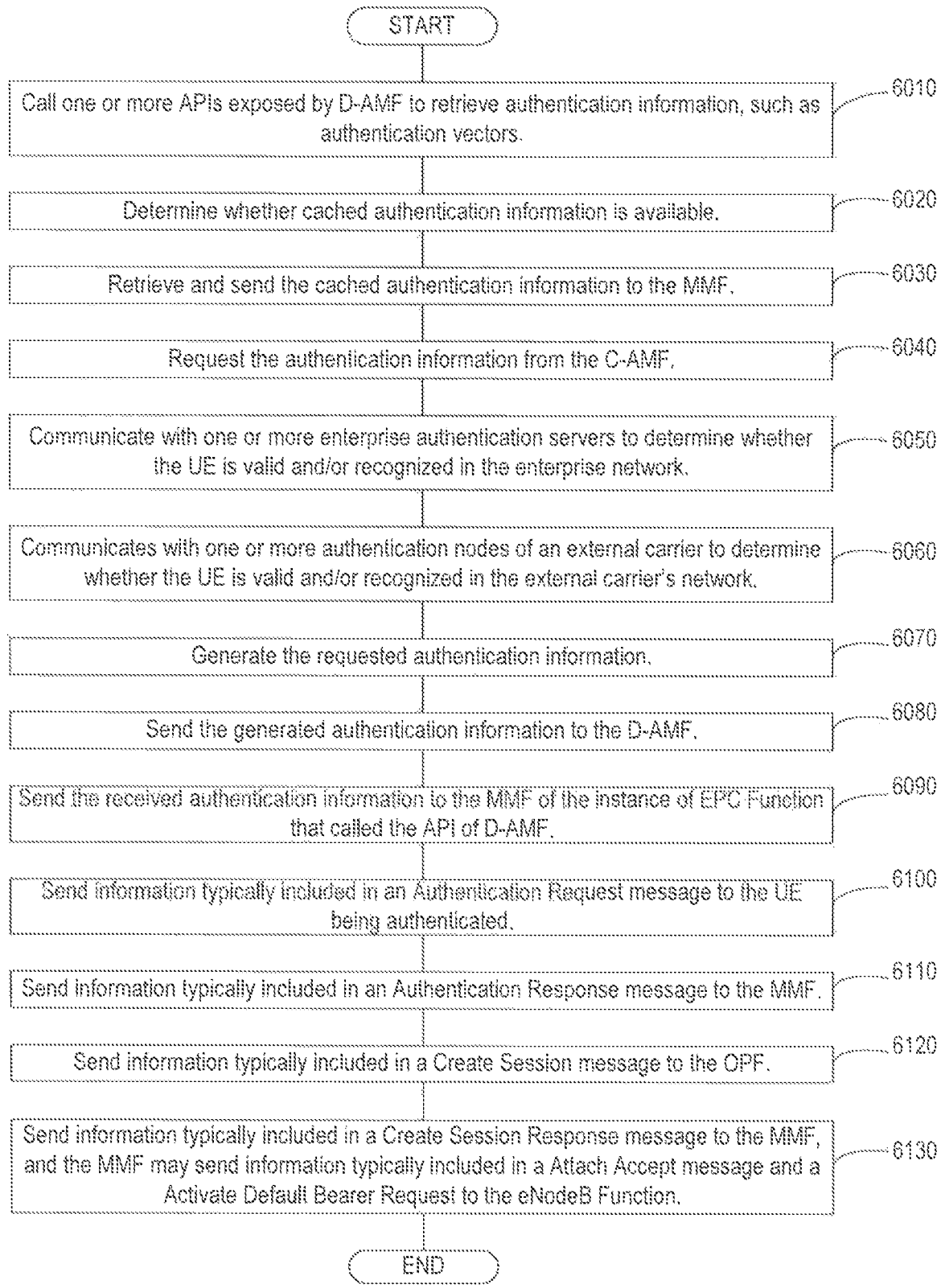
FIG. 6 is a flow diagram of an exemplary authentication and key agreement procedure in accordance with the disclosed embodiments.

FIG. 6 is a flow diagram of an exemplary authentication and key agreement procedure 6000 according to the disclosed embodiments. At step 6010, the MMF may call one or more APIs exposed by the D-AMF to retrieve authentication information, such as one or more authentication vectors. At step 6020, the D-AMF may determine whether cached authentication information is available. For example, the D-AMF may query a database containing cached authentication information. If the cached authentication information is available, at step 6030, the D-AMF may retrieve and send the cached authentication information to the MMF. If the cached authentication information is unavailable, at step 6040, the D-AMF may request the authentication information from the C-AMF. As noted previously, the D-AMF may communicate with the C-AMF using any cloud protocols supported by the cloud platform 2200.

After receiving the request, the C-AMF may determine whether the UE being authenticated is valid and recognized, for example, by using International Mobile Subscriber Identity (IMSI) information associated with the UE. For example, at step 6050, the C-AMF may communicate with one or more enterprise authentication servers to determine whether the UE is valid and/or recognized in the enterprise network 2300. The C-AMF may communicate with the EIAA 2310, such as Microsoft Active Directory, using a Single-Sign-On procedure or a Lightweight Directory Access Protocol (LDAP). In some embodiments, the C-AMF may communicate with an EIAA 2310 via an intermediate service cloud portion, such as Integrated Authentication Management (IAM) Plugin Authentication Policy Service.

At step 6060, the C-AMF communicates with one or more authentication nodes of an external carrier to determine whether the UE is valid and/or recognized in the external carrier's network. For example, the C-AMF may communicate with one or more Home Subscribe Server (HSS) node of an external carrier via a S6a interface (defined in the LTE standard) to determine whether the UE is valid and/or recognized by the external carrier(s). Advantageously, because the C-AMF can be used to manage all communications with the authentication servers or nodes, the MMF may authenticate the UE for multiple EIAAs and/or multiple authentication nodes using a single authentication and key agreement procedure. In contrast, the EPC 1200 in the conventional wireless access infrastructure 1000 would be able to authenticate a UE only for 3GPP access, and all enterprise authentication functions are executed as separate follow-on steps.

In some embodiments, the C-AMF may communicate with one or more HSS nodes of an external carrier via another cloud portion of a service ("S6a interface microservice"), which in turn communicates with the HSS nodes using a S6a interface.

At step 6070, if the UE is determined to be valid and recognized by the enterprise network 2300 and/or the external carrier at steps 6050 and 6060, the C-AMF may generate the requested authentication information, including for example, the authentication vector. In some embodiments, the generated authentication information may further include a base key, such as a KASME. At step 6080, the C-AMF may send the generated authentication information to the D-AMF. At step 6090, the D-AMF may send the received authentication information to the MMF of the instance of the EPC Function in the AP 2110 that called the API of the D-AMF.

At step 6100, the MMF may send information typically included in an Authentication Request message (as defined in the LTE standard) to the UE being authenticated. The Authentication Request message may contain parameters necessary to calculate the information typically included in an Authentication Response message (as defined in the LIE standard), including the calculated base key, such as a KASME.

At step 6110, the UE may send information typically included in an Authentication Response message (as defined in the LTE standard) to the MMF. In some embodiments, the UE may store a copy of the base key (e.g., KASME) within the UE. In some embodiments, the MMF may establish a security association between the UE and the MMF to protect the subsequent messages between the UE and the MMF, for example, by sending information typically included in a Security Mode Command (SMC) message. Additionally, the MMF may send information such as selected NAS algorithms, eKSI, ME Identity request, and UE security capability to the UE. Upon receiving the information typically included in the SMC message, the UE may check whether the security mode command can be accepted or not by checking the integrity of the message.

At step 6120, after the security association between the UE and the MMF is established, the MMF may send information typically included in a Create Session message (as defined in the LTE standard) to the OPF. In some embodiments, the OPF may send information typically included in a Credit Control Request (as defined in the LTE standard) to the C-PMF via the D-PMF, and the D-PMF may forward the default policy rules to the OPF. Policy rules may include, for example, quality of service information associated with the UE.

At step 6130, the OPF may send information typically included in a Create Session Response (as defined in the LTE standard) message to the MMF, and the MMF may send information typically included in a ATTACH Accept message and an Activate Default Bearer Request (as defined in the LTE standard) to an instance of the eNodeB Function 2112A. In some embodiments, the C-PMF may retrieve policy from an Enterprise Policy and QoS applications. Additionally, or alternatively, the C-PMF may retrieve policy from a node of another carrier (e.g., Policy and Charging Rules Function (PCRF)) via the IPX 2400 and using a standard Gx interface. Furthermore, the C-PMF may instruct the SDN controller 2500 to reconfigure the network devices 2150 based on the retrieved policy. For example, in some embodiments, the retrieve policy may include a QoS requirement for a UE, and the C-PMF may instruct the SDN controller 2500 to reconfigure the network device 2150 to provide the required QoS to the UE (and to the instance of the EPC Function 2114A assigned to the UE).

In the conventional wireless access infrastructure 1000, the communication between UEs, eNodeB, MME 1202, SG-W 1204, PGW 1206, HSS, and HCRF are performed using standardized messages/protocols defined in the LTE standard, such as Authentication Information Request/Answer, Authentication Request/Response, Secure Mode Command, Security Mode Complete, and Create Session Request/Response. However, as described above, the communications between the UEs, MMF, OPF, D-AMF, and C-AMF may be done using any message format and/or protocol in accordance with the disclosed embodiments of the invention.

Figure 7:
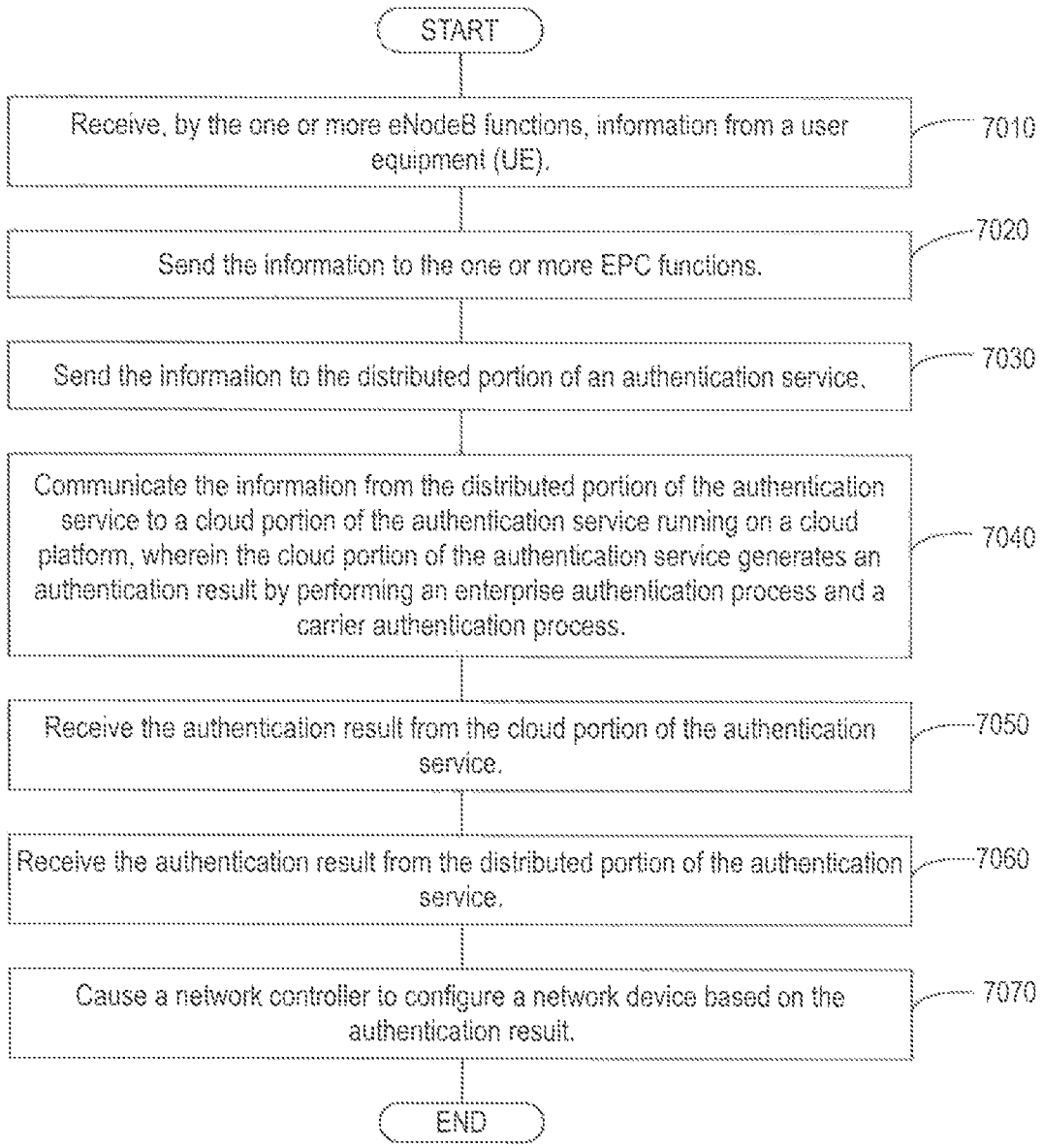
FIG. 7 is a flow diagram illustrating a sequence of steps that may be performed by an AP in accordance with the disclosed embodiments.

FIG. 7 is a flow diagram of a process 6000 performed by an AP 2110 in accordance with the disclosed embodiments. The AP 2110 may execute a set of one or more base-station functions for use by a UE, a set of one or more core-network functions, and a distributed portion of a service. At step 7010, the set of one or more base-station functions may receive information from the UE. At step 7020, the set of one or more core-network functions may receive the information from the set of one or more base-station functions. At step 7030, the distributed portion of the service may receive the information from the one or more core-network functions. At step 7040, the distributed portion of the service may communicate the information to a corresponding cloud portion of the service running on a cloud platform 2200. In some embodiments, the service may be provided by a combination of the distributed portion and the cloud portion of the service. At step 7050, the distributed portion of the service may receive a response from the cloud portion of the service based on processing performed by the cloud portion on the cloud platform.

At an optional step, the distributed portion of the service may send the response to the set of one or more core-network functions in accordance with the disclosed embodiments. Alternatively, or additionally, the distributed portion of the service may send a message derived from the received response to the set of one or more core-network functions. At another optional step, the set of one or more core-network functions may send the received response/message (or another message derived from the received response/message) to the set of one or more base-station functions in accordance with the disclosed embodiments. In some embodiments, the set of one or more base-stations functions, after receiving the response/message, may send the response/message to the UE. Alternatively, or additionally, the set of one or more base-stations functions may send another message derived from the received response/message to the set of one or more core-network functions.

Further to the disclosed embodiments of the invention, the cloud-based wireless access infrastructure 2000 may establish each user's connection to the wireless access infrastructure as an end-to-end set of resources across multiple functional layers. For example, an instance of eNodeB Function 2112A in the AP 2110 may use services to implement the air interface layers (e.g., PHY and MAC layers) and radio access layer (e.g., RRM), and the MMF and the OPF of an instance of the EPC Function 2114A, and may further use services to implement an enterprise network layer, cloud resource layer, and enterprise application layer. This connected set of resources across multiple layers representing a UE's wireless connectivity may enable configuration of the network devices 2150 to provide different QoS and ranges of services for each user, handling mobility of the user across dissimilar wireless networks, and other desired infrastructure behavior configured on a per-user basis.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An access point (AP), comprising:
  a memory storing instructions for execution by a processor; and
  at least one processor configured to execute the instructions to provide:
    a set of one or more base-station functions for use by a user equipment (UE) connected to the AP over a wireless communication interface, the one or more base-station functions being configured to receive information from the UE; and
    a set of one or more Evolved Packet Core (EPC) functions configured to receive the information from the set of one or more base-station functions,
    wherein a first subset of the one or more EPC functions is partitioned to a cloud portion of the one or more EPC functions and a second subset of the one or more EPC functions is partitioned to a distributed portion of the one or more EPC functions,
    wherein the cloud portion of the one or more EPC functions runs on a cloud platform,
    wherein the distributed portion of the one or more EPC functions runs on the AP separate from the cloud portion of the one or more EPC functions running on the cloud platform,
    wherein the one or more EPC functions is provided by a combination of the distributed portion and the cloud portion of the one or more EPC functions,
    wherein partitioning of the first subset of the one or more EPC functions to the cloud portion of the one or more EPC functions and the second subset of the one or more EPC functions to the distributed portion of the one or more EPC functions is optimized for each UE, and
    wherein the distributed portion of the one or more EPC functions is configured to send a message to one or more EPC functions of the first subset of the one or more EPC functions, and the one or more EPC functions is configured to cause one or more network devices to be configured based on the message.

2. The AP of claim 1, wherein the at least one processor is further configured to execute the instructions to instantiate an instance of the one or more base-station functions and instantiate an instance of the one or more EPC functions based on the UE wirelessly connecting to the AP.

3. The AP of claim 1, wherein the at least one processor is further configured to execute the instructions to dynamically instantiate an instance of the one or more base-station functions and an instance of the one or more EPC functions.

4. The AP of claim 1, wherein the one or more base-station functions is configured to communicate with the one or more EPC functions without using standardized communication interfaces.

5. The AP of claim 4, wherein the one or more base-station functions is configured to communicate with the one or more EPC functions using at least one of a procedure call, a remote-procedure call (RPC), Simple Object Access Protocol (SOAP), or Representational State Transfer (REST).

6. The AP of claim 1, wherein the one or more base-station functions further comprises at least one of a function of a physical (PHY) layer, a function of a media access control (MAC) layer, a function of a radio resource management (RRM), or a function of a self-organizing network (SON).

7. The AP of claim 1, wherein the one or more EPC functions further comprises at least one of a Mobility Management Function (MMF) or an Optimized Packet Function (OPF).

8. The AP of claim 1, wherein the at least one processor is further configured to execute the instructions to dynamically adjust a number of at least one of the one or more EPC functions or the one or more base-station functions to instantiate based on a real-time demand for resources by the UE.

9. The AP of claim 1, wherein separate instantiations of the base-station function are allocated to one or more service providers or wireless carriers.

10. The AP of claim 1, further comprising a distributed portion of a service configured to receive information from the EPC function and communicate the information to a corresponding cloud portion of the service, wherein the corresponding cloud portion of the service is configured to perform at least one of:
  returning an authentication result to the distributed portion of the service based on performing an authentication process;
  transmitting the authentication result to the EPC function for processing; or
  causing a network device to be configured in a software-defined networking architecture based on the authentication result.

11. The AP of claim 10, wherein the corresponding cloud portion of the service is further configured to communicate with a plurality of distributed portions of the service in different APs.

12. The AP of claim 10, wherein the distributed portion of the service is further configured to directly communicate information to the EPC function.

13. The AP of claim 10, wherein the corresponding cloud portion of the service is further configured to manage all communications with authentication servers or nodes.

14. The AP of claim 1, wherein the one or more EPC functions includes a Mobility Management Entity (MME), and at least one of the first subset or the second subset of the one or more EPC functions includes a Mobility Management Function (MMF).

15. The AP of claim 1, wherein the one or more EPC functions includes at least one of a Serving Gateway (SGW) node or a packet-data gateway (PGW) node, and at least one of the first subset or the second subset of the one or more EPC functions includes an Optimized Packet Function (OPF).

16. The AP of claim 1, wherein the at least one processor is further configured to execute the instructions to combine the one or more base-station functions and the one or more EPC functions in the AP.

17. The AP of claim 1, wherein the at least one processor is further configured to execute the instructions to allocate resources between the cloud platform and the AP.

18. The AP of claim 1, wherein the cloud platform includes one or more services having only cloud portions.

19. The AP of claim 1, wherein the one or more EPC functions is configured to implement an enterprise network layer, a cloud resource layer, and an enterprise application layer.

20. The AP of claim 19, wherein a connected set of the enterprise network layer, the cloud resource layer, and the enterprise application layer enable one or more network devices to be configured.

21. An access point (AP), comprising:
a memory storing instructions for execution by a processor; and
at least one processor configured to execute the instructions to provide:
a set of one or more base-station functions for use by a user equipment (UE) connected to the AP over a wireless communication interface, the one or more base-station functions being configured to receive information from the UE; and
a set of one or more Evolved Packet Core (EPC) functions configured to receive the information from the set of one or more base-station functions, wherein the EPC function comprises a control-plane portion and a user-plane portion, wherein the control-plane portion of the EPC function is configured to execute on at least one of a first processor core of the AP or a cloud platform and the user-plane portion of the EPC function is configured to execute on a second processor core of the AP,
wherein a first subset of the one or more EPC functions is partitioned to a cloud portion of the one or more EPC functions and a second subset of the one or more EPC functions is partitioned to a distributed portion of the one or more EPC functions,
wherein the cloud portion of the one or more EPC functions runs on a cloud platform,
wherein the distributed portion of the one or more EPC functions runs on the AP separate from the cloud portion of the one or more EPC functions running on the cloud platform,
wherein the one or more EPC functions is provided by a combination of the distributed portion and the cloud portion of the one or more EPC functions,
wherein partitioning of the first subset of the one or more EPC functions to the cloud portion of the one or more EPC functions and the second subset of the one or more EPC functions to the distributed portion of the one or more EPC functions is optimized for each UE, and
wherein the distributed portion of the one or more EPC functions is configured to send a message to one or more EPC functions of the first subset of the one or more EPC functions, and the one or more EPC functions is configured to cause one or more network devices to be configured based on the message.

22. The AP of claim 21, wherein the one or more EPC functions further comprises at least one of a Mobility Management Function (MMF) or an Optimized Packet Function (OPF).

23. The AP of claim 21, wherein:
the one or more EPC functions further comprises an Optimized Packet Function (OPF);
the control-plane portion comprises a control-plane portion of the OPF; and
the user-plane portion comprises a user-plane portion of the OPF.

24. The AP of claim 23, wherein:
the one or more EPC functions further comprises a Mobility Management Function (MMF); and
the MMF and the control-plane portion of the OPF are both executed on the first processor core of the AP.

25. The AP of claim 24, wherein the MMF is configured to communicate with the control-plane portion of the OPF on the first processor core of the AP.

26. The AP of claim 25, wherein the MMF is configured to communicate with the control-plane portion of the OPF on the first processor core of the AP using a proprietary protocol.

27. The AP of claim 21, wherein the control-plane portion is configured to perform control-plane functions to communicate with one or more services running on the cloud platform.

28. The AP of claim 21, wherein the user-plane portion is configured to perform user-plane functions comprising at least one of functions to create data packets, functions to process data packets, functions to communicate data packets to the base-station function, or functions to communicate data packets to one or more external networks.

29. The AP of claim 21, wherein separate instantiations of the base-station function are allocated by a single service provider or wireless carrier for use by multiple service providers or wireless carriers.

30. The AP of claim 21, further comprising a distributed portion of a service configured to receive information from the one or more EPC functions and communicate the information to a corresponding cloud portion of the service, wherein the corresponding cloud portion of the service is configured to perform at least one of:
returning an authentication result to the distributed portion of the service based on performing an authentication process;
transmitting the authentication result to the EPC function for processing; or
causing a network device to be configured in a software-defined networking architecture based on the authentication result.

31. The AP of claim 30, wherein the corresponding cloud portion of the service is further configured to communicate with a plurality of distributed portions of the service in different APs.

32. The AP of claim 30, wherein the distributed portion of the service is further configured to directly communicate information to the EPC function.

33. The AP of claim 30, wherein the corresponding cloud portion of the service is further configured to manage all communications with authentication servers or nodes.

34. The AP of claim 21, wherein the one or more EPC functions includes a Mobility Management Entity (MME), and at least one of the first subset or the second subset of the one or more EPC functions includes a Mobility Management Function (MMF).

35. The AP of claim 21, wherein the one or more EPC functions includes at least one of a Serving Gateway (SGW) node or a packet-data gateway (PGW) node, and at least one of the first subset or the second subset of the one or more EPC functions includes an Optimized Packet Function (OPF).

36. The AP of claim 21, wherein the at least one processor is further configured to execute the instructions to combine the one or more base-station functions and the one or more EPC functions in the AP.

37. The AP of claim 21, wherein the at least one processor is further configured to execute the instructions to allocate resources between the cloud platform and the AP.

38. The AP of claim 21, wherein the cloud platform includes one or more services having only cloud portions.

39. The AP of claim 21, wherein the one or more EPC functions is configured to implement an enterprise network layer, a cloud resource layer, and an enterprise application layer.

40. The AP of claim 39, wherein a connected set of the enterprise network layer, the cloud resource layer, and the enterprise application layer enable one or more network devices to be configured.

* * * * *